Jan. 24, 1967    NAM P. SUH ETAL    3,299,812
ELECTRIC IGNITION CARTRIDGES
Filed Jan. 29, 1965    4 Sheets-Sheet 1

*Inventors*
Nam P. Suh
George C. Fuller
By their Attorney

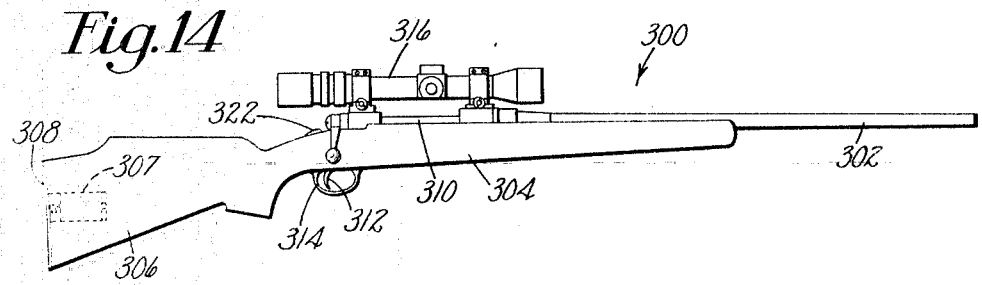
Fig. 14
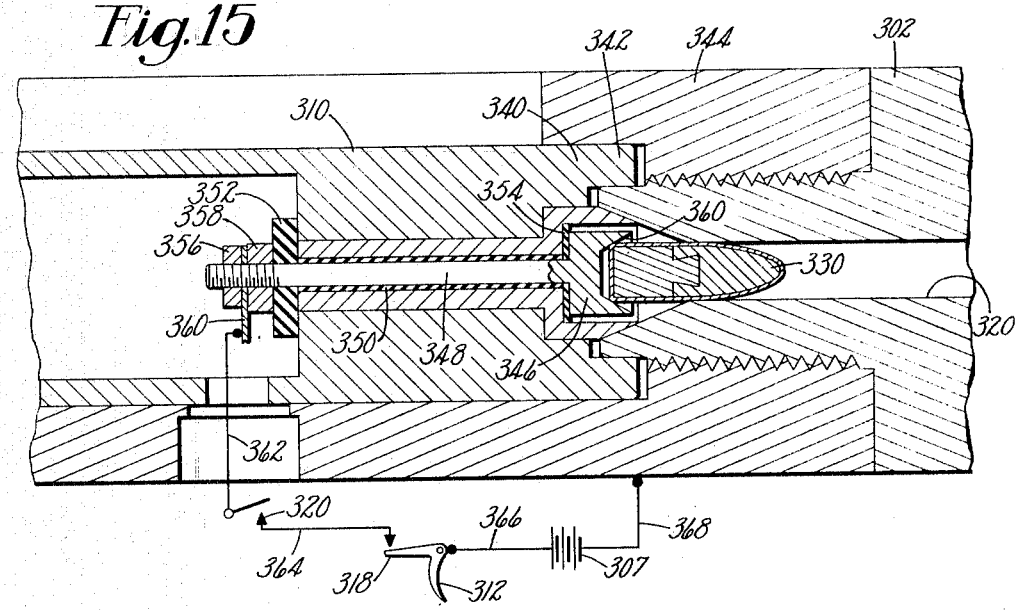
Fig. 15
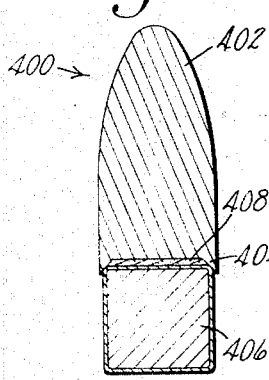 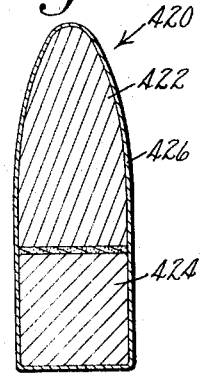 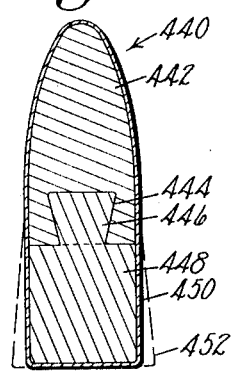
Fig. 16  Fig. 17  Fig. 18

United States Patent Office 3,299,812
Patented Jan. 24, 1967

3,299,812
ELECTRIC IGNITION CARTRIDGES
Nam P. Suh, Magnolia, and George C. Fuller, Wellesley, Mass., assignors to United Shoe Machinery Corporation, Flemington, N.J., and Boston, Mass., a corporation of New Jersey
Filed Jan. 29, 1965, Ser. No. 428,921
4 Claims. (Cl. 102—39)

This invention relates to ammunition and explosive devices and more particularly to improvements in methods of initiating a deflagrating explosive, to improvements in cartridges for explosively actuated implements and to methods of and apparatus for using such cartridges. In one aspect of the invention it features the provision of a caseless primer-less cartridge comprising a pellet of deflagrating explosive, suitably cylindrical in form, adapted to be ignited by the passage of an electric current through a metallic coating on the pellet for generating power in such implements.

Present explosively actuated tools such as stud drivers and the like have commonly employed as their power source a blank cartridge comprising a brass case, a primer carried by the case and adapted to be initiated by percussion, a charge of deflagrating explosive, and means closing the end of the case. The most commonly employed of these are .22 caliber blank cartridges.

Such cartridges, having casing and primer means, are relatively expensive and efforts have been made to provide methods of initiating a deflagrating explosive system in a form suitable for use in portable tools which can obviate some of the expense attendant upon the use of an encased primer initiated cartridge. Problems involved with the ignition of such explosives in the production of energy commonly involve either exquisite tolerances, the expenditure of considerable amount of stored energy to effect ignition or failure of the system to be adapted to multiple use or requiring the use of sensitive primers. As yet no such system has been sufficiently successful to supplant the .22 blank cartridge with its reliability and convenience.

Accordingly, it is an object of the present invention to provide a cartridge comprising a pellet of deflagrating explosive which is adapted readily to be ignited in a uniform, reliable manner, is relatively safe and inexpensive.

To this end and in accordance with a feature of the invention there is provided a cartridge comprising a metal coated pellet of deflagrating explosive, suitably in a cylindrical form, which pellet is adapted for ignition by the passage of electric current through the coating, suitably from one end to the other of the cylindrical periphery thereof. One of the problems involved in attempting to ignite a charge of deflagrating explosive by electricity, especially in a portable tool, is to provide a sufficiently uniform ignition with a minimum expenditure of electrical energy. The amount of electric energy required for ignition of the pellet provided by the present invention is so small, being, for example, in the order of 5 watt-seconds for the ignition of a cylindrical grain of powder equivalent to about one-half the charge of .22 long rifle cartridge. Several thousand shots may be fired on one charge of a 4 ampere-hour nickel-cadmium storage cell of 1.25 volts. This makes the system eminently advantageous in portable equipment.

Another object of the invention is the provision of explosively operated apparatus comprising electrodes suitable for use as a power generator and constituting a readily available source of compressed hot gaseous fluid.

Another object of the invention is a provision of a method for setting a hollow rivet in which a cartridge constructed in accordance with the present invention is disposed at the base of a closed central cavity of the rivet and ignited by the application thereto of electric current by means of electrodes, one of which comprises the rivet.

Another object of the invention is the provision of an improved rifle adapted for employing as its ammunition a cartridge constructed in accordance with the present invention.

Yet another object of the present invention is the provision of ammunition for rifles and the like comprising a projectile carrying at its base or tail end a pellet of propellant coated and adapted for electric ignition in accordance with the present invention.

Other features and advantages of the present invention will best be understood from the following description taken together with the accompanying drawings in which, FIG. 1 is a plan view on a greatly enlarged scale of a cartridge comprising a cylindrical pellet of deflagrating explosive embodying the present invention;

FIG. 14 is a side elevation of a rifle adapted to employ a cartridge embodying the present invention;

FIG. 15 is a vertial section on an enlarged scale of a portion of the breech mechanism of the rifle shown in FIG. 14 and showing diagrammatically the firing circuit therefor;

FIG. 16 is a vertical section on a greatly enlarged scale of a cartridge embodying the present invention and adapted to be used in the rifle of FIG. 14;

FIG. 17 is a modified form of cartridge; and

FIG. 18 illustrates yet another modified form of cartridge embodying the present invention.

Figure 1:
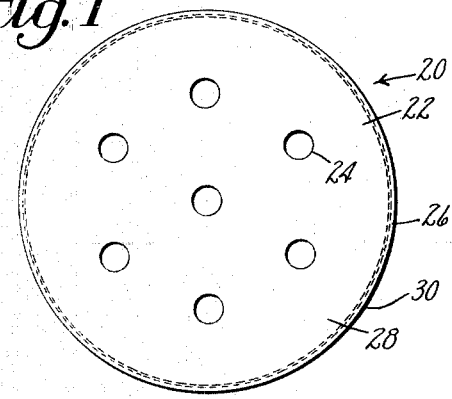
Figure 2:
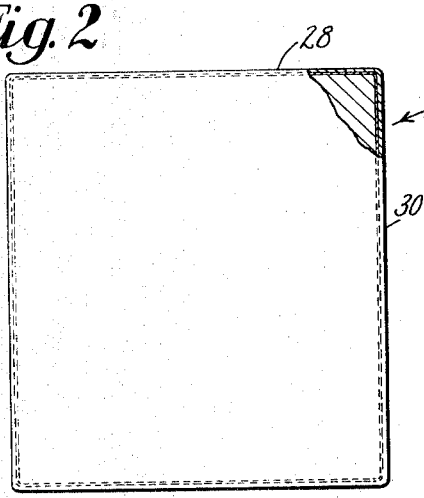
FIG. 2 is a side elevation partly in section of the cartridge shown in FIG. 1.

Referring to the drawings, FIGS. 1 and 2 illustrate a blank cartridge 20 manufactured in accordance with the present invention. The cartridge comprises a pellet formed of a cylindrical grain or a plurality of grains compacted into cylindrical form of deflagrating explosive 22, suitably a double base smokeless powder comprising a nitrocellulose and nitroglycerin. The illustrative grain is suitably formed with axially directed holes 24 in accordance with combustion time requirements.

In accordance with the present invention the pellet 22 of deflagrating explosive is provided with a coating 26 of a metal capable in such disposition of being heated by the passage of an electric current therethrough to a temperature adequate to ignite the adjacent surface portion of the explosive.

As shown in FIG. 2, we have divided the peripheral surface of the cylindrical pellet 20 into end peripheral surface portions 28 and cylindrical surface portions 30. As best seen in FIG. 2, the cylindrical pellet is substantially in the form of the volume generated by a rectangle rotated around one side thereof as an axis and the cylindrical surface portion 30 is defined by the surface traced by the side parallel to said one side.

Figure 3:
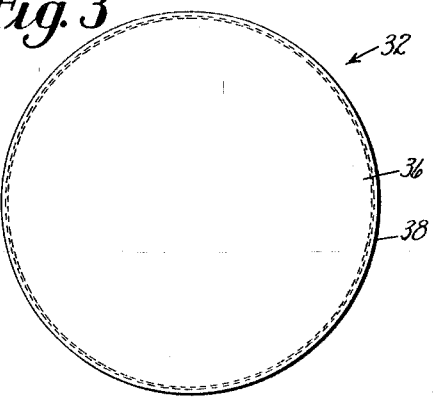
FIG. 3 is a plan view of a modification of the invention illustrated in FIG. 1 on the same scale.
Figure 4:
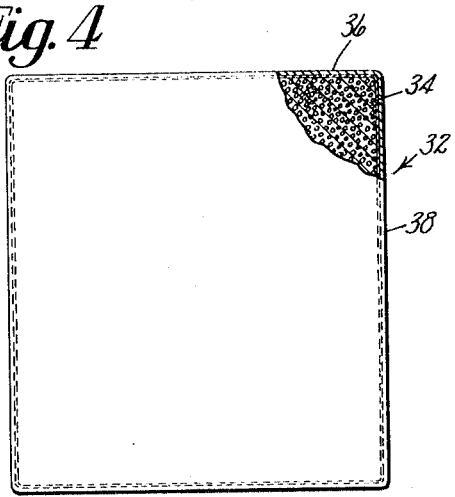
FIG. 4 is a side elevation partly in section of the modification shown in FIG. 3.

FIGS. 3 and 4 illustrate a modification in which the cartridge 32 comprises a cylinder 34 of foamed deflagrating explosive, suitably double base smokeless powder, the closed cell foamed condition of the powder providing by its added surface area a high burning rate of the powder. The cylinder is coated with metal on its end 36 and cylindrical peripheral surface portions 38 in the same manner as the cartridge illustrated in FIGS. 1 and 2.

Figure 5:
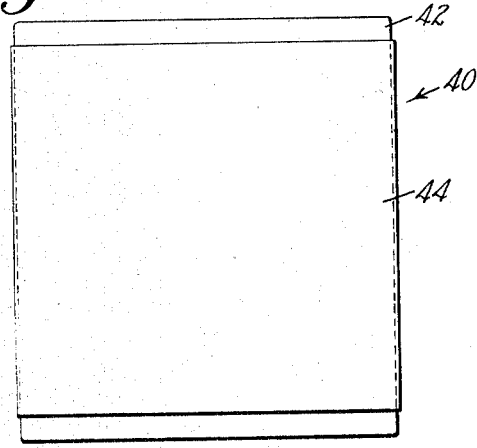
FIG. 5 is a side elevation on a greatly enlarged scale of a cartridge embodying the present invention and provided with an external layer of insulating material.

FIG. 5 illustrates an insulated cartridge 40 comprising a metal coated cylinder 42 of deflagrating explosive of the type hereinbefore described and additionally provided with an outer layer 44 of insulating material covering at least a portion of the cylindrical surface of the cylinder 42. Where a minimum residue is desired, the insulating material may suitably consist of nitrocellulose.

Figure 6:
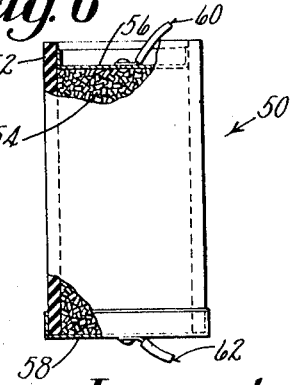
FIG. 6 is a side elevation on a smaller but still greatly enlarged scale and partly broken away of a modified form of cartridge embodying the present invention.

FIG. 6 illustrates a charge 50 useful, for example, in applications requiring the generation of a large volume of gaseous fluid. The charge 50 comprises a hollow cylindrical casing 52 of insulating material filled with closely packed cartridges 54 of the type hereinbefore described and closed at its ends by metal plates 56 and 58 forming electrodes for the application of a current of electricity through the packed cartridges from one end of the cylinder to the other. The current, applied through the leads 60, 62 will, of course, need to be relatively large with respect to that required for the ignition of a single cartridge.

A number of different metals and alloys are technically feasible for coating pellets in this application including silver, nickel, zinc, aluminum, copper, iron, cobalt, molybdenum, gold and platinum; suitably the coating is provided by plating; iron requires a protective coating from oxidization as soon as it has been plated on the pellet. The metals are plated on the pellets by any suitable means including electroless plating, electroplating and vacuum diffusion deposition.

As an example, cylindrical pellets 3/16" in diameter and 1/8" long were nickel plated over a copper base by electroplating in a nickel sulfamate solution buffered with boric acid at pH 3.5–5 in accordance with U.S. Patent No. 2,318,592. The copper base is provided by an electroless plating process comprising dipping the pellets successively and with intermediate rinsings into solution of stannous chloride and hydrochloric acid as a sensitizer, palladium chloride and hydrochloric acid as a catalyst and then for copper deposition into a bath comprising equal parts of solution A and B. To make one gallon of solution A, 2.24 ounces of nickelous chloride are mixed into 500 cc. of water, 7.5 ounces of copper sulphate are added and after mixing well this solution is added to 2500 cc. of formalin and diluted with water to make a gallon. To make a gallon of solution B, 5.5 ounces of sodium hydroxide are dissolved in 2000 cc. of water to which 2.25 ounces of sodium carbonate and 1 pound 8.5 ounces of Rochelle salts (pot. sod. tartrate) are sequentially added and the solution diluted to one gallon. Solutions A and B are mixed soon before use and a 25 minute dip period provides a very thin copper coating on the pellets.

Other so-called electroless methods of plating are known to those skilled in the art and may be employed where suitable.

After a conductive layer, such as the copper coating, has been provided, other metals may be electroplated on the pellet. The thickness of the plating deposited on the fuel pellet should be sufficient to avoid inconsistent burning upon ignition due to burning away of the plating at the contacts before central portions of the cylindrical periphery have been heated to ignition temperature. A suitable thickness of nickel plate is about $6 \times 10^{-4}$ in. This was applied at a rate $$\frac{\text{Average coating thickness (in.)}}{\text{Time (min.)} \times \text{current density (amp-min.)}}$$

of about $1.25 \times 10^{-4}$ in.$^3$ amp-min.

Figure 7:
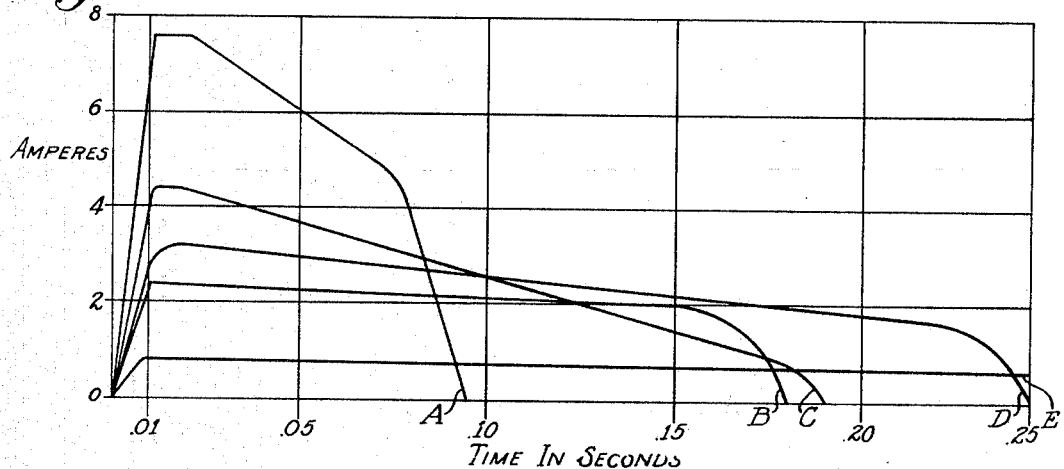
FIG. 7 is a graph showing curves illustrating certain aspects of the present invention.

The thickness of the metal coating applied to a pellet affects the performance of the cartridge in a number of ways. The coating must be thick enough to avoid inconsistent burning of the explosive due to the burning away of the pellet at the end contacts. The thickness of the coating also affects the ignition time and the amount of energy required to ignite the pellet. FIG. 7 shows curves representing the firing current with respect to time for cartridges having different thicknesses of nickel plating.

Figure 8:
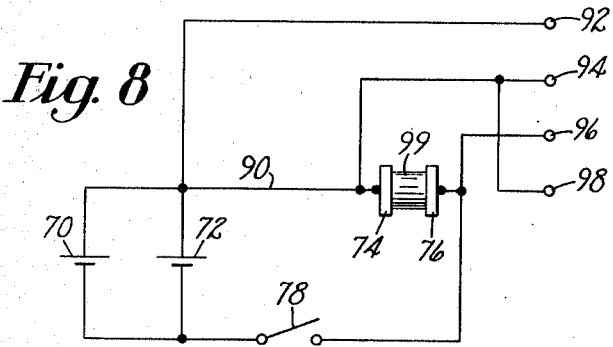
FIG. 8 is a schematic diagram illustrating the circuit from which the curves of FIG. 7 were obtained.

The test setup by which the curves of FIG. 7 were obtained is diagrammed in FIG. 8 and comprises two "D" size 4 amp-hr. nickel-cadmium cells 70, 72 wired in parallel for providing current at 1.2 volts, clamp means fitted with insulated copper strap terminals 74, 76, a heavy duty toggle switch 78 and heavy Belden braid conductors connecting the cells, switch and terminals in series. From junctions at either end of a portion 90 of Belden braid having a resistance of 0.006 ohm, connections were made to a Sanborn chart recorder at terminals 92 and 94 to record the current and simultaneously therewith from terminals 96 and 98 connected to junctions adjacent the terminals 74 and 76 the voltage developed across a cartridge 99.

Five separate groups of cartridges were tested, the average performance of the groups being represented by curves A, B, C, D and E of FIG. 7. The cartridges of the group represented by curve A had resistances respectively of 0.015, 0.007, 0.012, 0.012, 0.015 ohm. The average time of disruption of the circuit was about 0.095 second. The cartridges of the group represented by curve B had resistances of 0.075, 0.082, 0.077, 0.092, 0.051 ohm. Three failed to ignite; two ignited at the end of 0.18 second. The cartridges of group 3 had resistances of 0.036, 0.027, 0.017, 0.027 and 0.021 with burning time respectively 0.13, 0.07, 0.22, 0.18, 0.15 second. The cartridges of curve D averaged about .04 ohm; two failed to ignite, the burning time of the others averaged 0.25 second. In group E a pellet having a resistance of 0.157 ohm required 0.65 second to ignite.

One of the major problems with respect to the ignition of a metal coated cartridge is to overcome, so far as possible, the concentrated heating effect of contact resistance at the end surface portions of the cartridge. To minimize such resistance we have employed contact terminals 100, 102 (FIG. 9) each being formed with a truncated conical recess 104 and being adapted to receive an end portion of a metal coated cartridge 106 with the inner conical surface 108 of the terminal engaging the cartridge at the junction of its end surface and cylindrical surface portions. These terminals, by reason of their conical surfaces, have a self-cleaning action when moved into engagement with the cartridges, particularly when slightly rotated relative thereto.

Figure 9:
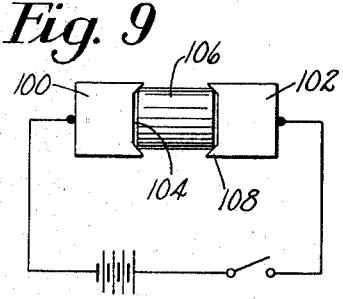
FIG. 9 is a diagrammatic representation of a firing circuit including electrodes embodying the present invention.
Figure 10:
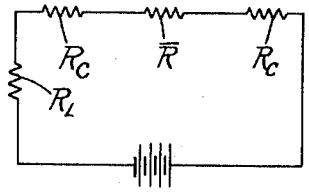
FIG. 10 is a schematic diagram of the equivalent electrical circuit corresponding to that of FIG. 9.

FIG. 10 is a schematic of the equivalent circuit of the firing circuit shown in FIG. 9 expressed in terms of lead resistance $R_L$, contact resistance $R_C$ and the resistance of the metal coating of the cartridge $\overline{R}$. The importance of the contact resistance indicated in the equivalent circuit will be apparent from the fact that the ratio of $\overline{R}$ to the contact resistance $2R_C$ is about 1 to 4, and from the following discussion relating to factors affecting the temperature rise time in the cartridge.

(1) The temperature rise can be *roughly* calculated using the following equation:

$$\Delta T = C_1 \frac{I^2 R}{HPW} \left[ 1 - \exp\left( -\frac{HP}{C_p W} t \right) \right] \quad (1)$$

where $\Delta T$ = rise in temperature of the metal-propellant interface [°F.]
$I$ = current [amp]
$R$ = resistivity of the metal [ohm-cm.]
$H$ = heat transfer coefficient which includes the loss to its surrounding as well as the heat transmission to the propellant $$\left[\frac{\text{B.t.u.}}{\text{°F. hr.ft.}^2}\right]$$

$W$ = cross-sectional area of metal coating [ft.²]
$P$ = perimeter [ft.]
$C$ = specific heat $$C = \text{specific heat} \left[\frac{\text{B.t.u.}}{\text{lb. °F.}}\right]$$

$$p = \text{density} \left[\frac{\text{lb.}}{\text{ft.}^3}\right]$$

$t$ = time [hr.]
$C_1$ = constant of unit conversion = 0.1119

$$\left[\frac{\text{B.t.u. ft.}}{\text{watt hr. cm.}}\right]$$

Equation 1 may be re-written as:

$$\Delta T = C_2 \frac{E^2 A}{RL^2 H}\left[1 - \exp.\left(-\frac{H}{CpA}t\right)\right] \quad (2)$$

where $E$ = the battery voltage [volts]
$A$ = thickness of plated metal [ft.]
$L$ = length of the pellet [ft.]
$C_2$ = constant of unit conversion = 104

$$\left[\frac{\text{B.t.u. cm.}}{\text{watt hr. ft.}}\right]$$

Equations 1 and 2 do not include the lead and the contact resistance. If we include the contact resistance Equation 2 may be modified to be:

$$\Delta T = C_1 \frac{E^2 R}{\left[\frac{RL}{6 I \pi R_0 A} + 2 R_c\right]^2} \frac{1}{H 4\pi^2 R_0^2 A}\left[1 - \exp.\left(-\frac{H}{CpA}t\right)\right] \quad (3)$$

where $R_c$ = the contact resistance at the contact point [ohm]
$R_0$ = the radius of the pellet [ft.].

In all these expressions, $\Delta T$ represents the temperature rise at points away from the contact point.
If $$2R_c \gg \frac{RL}{6 I \pi R_0 A}$$

(contact resistance ≫ resistance in metal), then Equation 3 may be reduced to:

$$\Delta T = C_1 \frac{E^2 R}{16\pi^2 R_0^2 A R_c^2 H}\left[1 - \exp.\left(-\frac{H}{CpA}t\right)\right] \quad (4)$$

Note that—

(1) Both Equation 2 and Equation 3 state that if the resistivity, which is solely a function of metal, decreases by a certain factor, the thickness of coating can decrease by the same factor.

(2) Equation 4 states that when the contact resistance is much higher than the resistance of the metal layer, the change in pellet length makes little difference.

(3) Equations 2 and 4 state that if the resistivity of the metal is decreased by a certain factor, the rise time increases (provided the term $Cp$ stays almost the same) as an exponential function of one over thickness, because the thickness of the plated layer can be decreased accordingly as stated in (1). Usually if the resistivity decreases, $C$ also decreases. Thus, the rise time is further accelerated.

(4) Equation 3 states that if the contact resistance is not large, the length of the pellet will have a significant effect on the rise time, but it is expected that the contact resistance will always be present.

The temperature rise at the contact point may be evaluated from the following equation:

$$\Delta T \sim \frac{I^2 R_C}{H_0 P_0 L_0}\left[1 - \exp.\left(-\frac{H_0 P_0}{CpW_0}t\right)\right] \quad (5)$$

where $H_0$ = the heat transfer coefficient at the point of contact.
$P_0$ = effective girth for heat loss.
$L_0$ = the distance through which a large voltage drop occurs.
$W_0$ = the *real* area of contact between the electrodes and the propellant.

It is expected that $R_c$ will be large and $L_0$ and $W_0$ will be small. Thus, the temperature rise at the contact point can be substantial.

(2) Properties of various metals: (a) Nickel—The experimental results indicate that when the thickness of coating is $6 \times 10^{-4}$ inch, the average current flow is about 6 amps which is within the acceptable limt for use of "D" cell Ni-Cd batteries as the electric energy source. If the thickness is much thinner than $3.5 \times 10^{-4}$, burn-up of the contact points was experienced.

The electric contact was destroyed in about 0.9 second when the thickness was $6 \times 10^{-4}$. As the thickness decreased, the contact lasted longer consuming more energy. The electricity consumed is in the neighborhood of 6 amp-sec.

The reason a thick plating gives a lower consumption of electric energy is that the ignition takes place so rapidly that the gas pressure immediately breaks the continuity of the plated metal. The loss of energy by conduction to the inner core of the fuel and the surrounding is limited when high current is passed through the conductor.

Nickel's strong points are:

(1) Corrosion resistance
(2) High abrasion resistance
(3) Easy to plate at room temperature
(4) Non-organic plating bath (non-solvent)
(5) Relatively low cost Its weak points are:

(1) High electric resistance, thus thick plating
(2) High latent heat of fusion and evaporation
(3) High boiling and melting point
(4) High $CpA$, thus, slow rise time Other metals such as aluminum, zinc, copper, and silver may be employed. In any given application, the above-stated considerations (cost, electrical and physical properties, etc.) will govern the choice.

Figure 11:
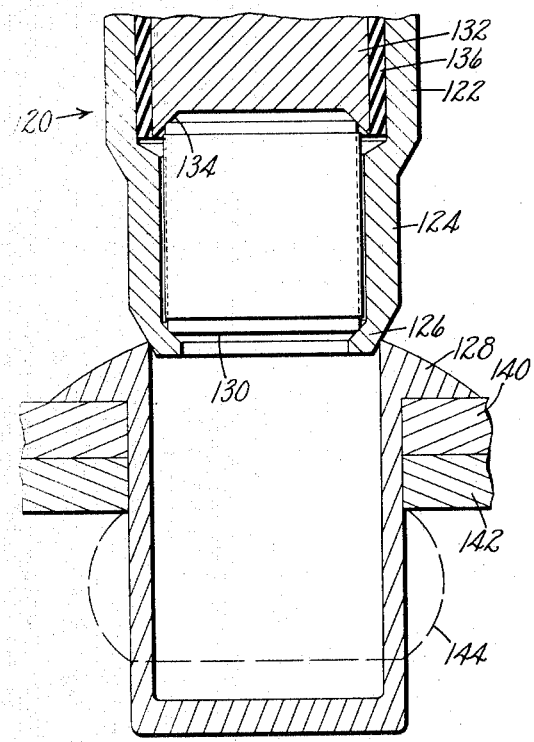
FIG. 11 is a median vertical section greatly enlarged of a rivet setting tool embodying the present invention.

FIG. 11 shows the nozzle end of a rivet setting tool 120 for setting hollow rivets employing power generated by cartridges provided by the present invention. The tool comprises a generally cylindrical barrel 122 having an end portion 124 of reduced diameter formed with a tapered tip 126 having a terminal diameter adapting it to fit within the open end of a hollow rivet 128. The inner surface of the barrel at the tip 126 has a conic taper. The reduced portion 124 has an internal diameter adapted to receive a cartridge preferably of the type illustrated in FIG. 5 with its lower circumferential portion 130 in engagement with the conic interior surface of the tip 126. The barrel is sealable above the portion 124 by a bolt mechanism 132 comprising an internal conductive electrode member and having conically tapered surfaces 134 and having a jacket 136 of insulating material. The bolt is conventionally removably retained within the barrel 122 by mechanism not shown and the electrode 132 is connected to one side of a firing circuit similar to that shown in FIG. 9. The other side of the firing circuit may be connected either to the barrel 122 or, if the material 140, 142 to be received is conductive, to the work piece. In use, the tool is held with the barrel tip in the disposition illustrated and the firing circuit closed. The tool may be held either in a jig or hand held. In the latter case the tool will preferably be massive to provide inertial opposition to the force of the generated gases. The disposition of the cartridge in the tip of the tool is highly advantageous so that the expanding gases have a minimum length of travel before doing their work. The expanded position of the rivet base is illustrated by dashed line 144.

Figure 12:
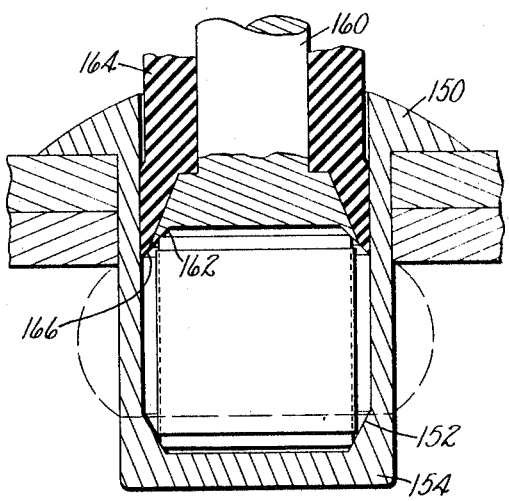
FIG. 12 is a similar view of a riveting tool embodying the present invention.

FIG. 12 illustrates a rivet setting arrangement in which a hollow rivet 150 is formed with a recess providing internal circumferential conical surfaces 152 adjacent a base portion 154, the recess having an internal diameter suitable for receiving a cartridge preferably of the type shown in FIG. 5 with the circumferential portion of one end in engagement with the surface 152. The riveting tool now comprises an electrode 160 formed with conical surfaces 162 for receiving the other circumferential end portion of the cartridge and provided with a preferably resilient sleeve 164 of insulating material having a tip portion 166 preferably forming an extension of the conical surface portion 162 and providing a sealing flap for maximum retention of the gases. The electrode 160 is connected to one side of the firing circuit while the rivet or work is connected to the other.

Figure 13:
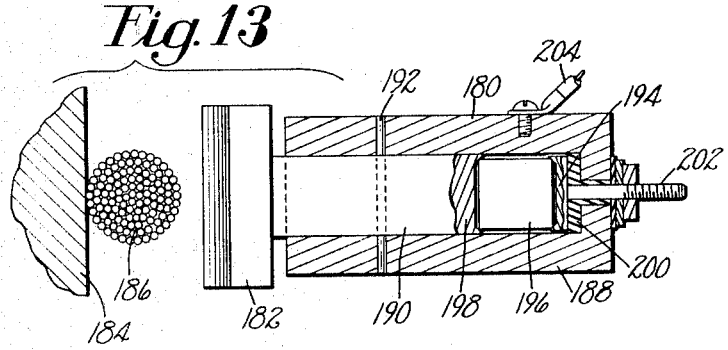
FIG. 13 is a vertical median section of a tool employing the cartridge of the present invention.

FIG. 13 shows an actuator 180 arranged to carry a knife 182 against a support 184 for parting a cable 186. The actuator comprises a barrel 188 forming a hollow cylinder in which slides a piston 190 connected to the knife 182 and temporarily retained in position by a shear pin 192. The barrel 188 carries at its base in insulated relation thereto an electrode 194 adapted to engage an end circumference portion of a cartridge 196 while the piston 190 has its end formed with surfaces for similarly engaging the other end of the cartridge. Insulating washer and sleeve means 200 insulate a a threaded shank 202 of the electrode 194 from the barrel 188. The shank 202 is connected to one side of the firing circuit while the barrel is connected to the other, conveniently through a lead 204.

FIGS. 14 through 18 disclose an improved rifle and ammunition therefor. The rifle 300 comprises a barrel 302 mounted on a stock 304 having a butt portion 306 provided with a butt plate 308. The rifle also comprises a bolt 310, trigger 312 and trigger guard 314 and is provided with a sight 316. The butt 306 is formed with a recess opening through the butt plate 308 adapting it to receive a nickel-cadmium "D" size cell with contact means for connecting it to a firing circuit comprising a trigger switch 318 (FIG. 15) and safety switch 320 operated by a slidable actuator 322 (FIG. 14).

Referring now particularly to FIG. 15, the barrel 302 has a rifled bore 320 and is formed at the breech end with an outwardly tapering flare to provide a generally funnel shaped chamber so that the internal flared surface is spaced away from the base of a cartridge 330 disposed in the chamber with its bullet or projectile seated in the bore 320. The bolt 310 has a forward portion 340 adapted to be moved into sealing engagement with the breech end of the barrel, a cylindrical forward portion 342 interfitting between the barrel and a receiver 344 of the rifle. An electrode 346 having a shank portion 348 is mounted axially in the forward portion of the bolt 310 and insulated therefrom by a sleeve 350 and washers 352 and 354 of insulating material, the electrode being retained by nuts 356 and 358 threadedly engaging the end of the shank 348. The electrode 346 is formed with conical surfaces 360 adapted to engage the circumferential portion of the base of the cartridge 330. Means for connecting the electrode 346 and barrel 302 in a firing circuit with the battery 307 comprise a conductor 360 clamped between the nuts 356 and 358, a lead 362 connecting the conductor to the safety switch 320, a lead 364 between the switch 320 and the switch 318, a conductor 366 between the switch 318 and the battery 307 and a conductor 368 between the battery and the receiver 344.

FIG. 16 illustrates a cartridge 400 comprising a projectile 402 formed with a base portion having a recess formed with a conical interior surface 404 and having a metal coated pellet 406 of deflagrating explosive bonded to the projectile suitably by an epoxy adhesive 408.

FIG. 17 illustrates a cartridge 420 in which a projectile 422 carries, suitably in adhesively bonded relation, a cylindrical pellet of deflagrating explosive 424, the entire periphery of the projectile and pellet assembly having a metal coating 426 serving as the igniting element for the pellet 424.

FIG. 18 illustrates a cartridge 440 comprising a projectile 442 having formed in its base a dovetail recess 444 into which is molded a locking portion 446 of an otherwise cylindrical pellet 448, the entire periphery of the projectile and pellet carrying a metal coating 450 suitable for electrical ignition of the pellet as hereinbefore described. If desired, the pellet may be formed to taper to increase in diameter from the trailing end of the projectile 442 toward the base of the cartridge as indicated by the dash line 452 to facilitate suitably seating the cartridge in its chamber with pressure between the base of the cartridge and the electrode 346.

The invention is applicable to many other uses and explosively actuated implements and tools, for example, explosively actuated crimping tools, and the scope thereof is not to be considered to be limited other than by the definitions in the appended claims.

It is contemplated that in certain applications such as portable power tools, an electric generator may be operated by the tool on each shot, either to maintain a charge on an electric storage device or to furnish the ignition energy directly, the tool having stored the energy as by a spring on the previous shot.

Having thus described our invention, what we claim as new and desire to secure by Letters Patent of the United States is:

1. In combination, a pellet of deflagrating explosive having a longitudinal axis and a maximum diameter of at least about 3/16" and provided with a surface coating of metal not more than about 0.0006" thick and occupying intermediate the ends of said pellet not more than about 2% of the maximum cross-sectional area thereof together with means, comprising a pair of mutually insulated electrodes engaging said coating at spaced locations, for connecting a source of electric current to said coating for igniting said explosive.

2. In combination, a pellet of deflagrating explosive provided with a relatively thin coating of metal in immediate contact with the peripheral surface of said pellet and completely enclosing said pellet, and means comprising a pair of mutually insulated electrodes engaging said coating at spaced locations for connecting a source of electric current to said coating for igniting said explosive.

3. The combination as defined in claim 2 in which said pellet has generally circular opposite end portions.

4. A combination as defined in claim 2 in which said pellet has a longitudinal axis and a maximum diameter of at least about 3/16" and is provided with a surface coating of metal not more than about 0.0006", said coating occupying intermediate the ends of said pellet not more than about 2% the maximum cross-sectional area thereof.

(References on following page)

References Cited by the Examiner

UNITED STATES PATENTS

| | | | |
|---|---|---|---|
| 552,919 | 1/1896 | Maxim | 102—98 |
| 1,036,176 | 8/1912 | Bichel | 102—98 X |
| 2,963,810 | 12/1960 | Robinson | 42—16 |
| 3,010,399 | 11/1961 | Manning | 102—98 |
| 3,013,355 | 12/1961 | Weatherby | 42—16 |
| 3,034,289 | 5/1962 | Stott et al. | 60—26.1 |
| 3,049,868 | 8/1962 | Adams et al. | 60—26.1 |
| 3,054,258 | 9/1962 | Marti | 102—39 X |
| 3,060,879 | 10/1962 | Staba | 72—56 |
| 3,065,720 | 11/1962 | Rarbin | 72—56 |
| 3,140,659 | 7/1964 | Van Artsdalen et al. | 102—38 |
| 3,151,559 | 10/1964 | Schermuly | 102—98 |
| 3,175,494 | 3/1965 | Turner | 102—38 |
| 3,198,677 | 8/1965 | Thomas | 102—98 |
| 3,212,440 | 10/1965 | Quinlan et al. | 102—38 |

BENJAMIN A. BORCHELT, *Primary Examiner.*

ROBERT F. STAHL, SAMUEL FEINBERG, *Examiners.*